April 15, 1930.  I. CASH  1,754,458
MUSICAL EDUCATIONAL TOY
Filed Nov. 13, 1928
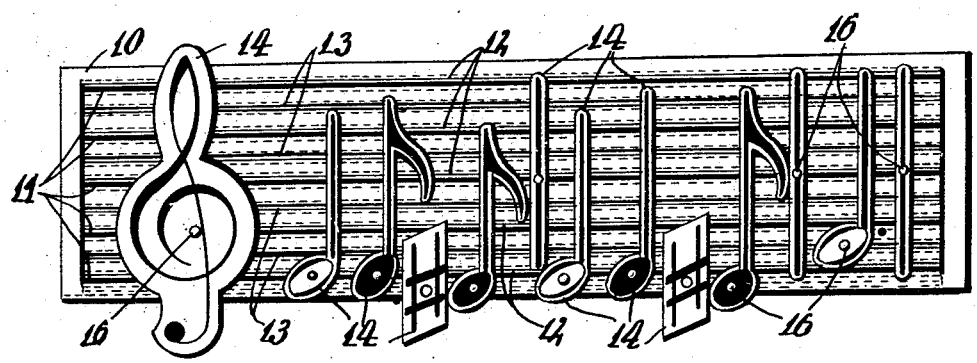
Fig. 1.
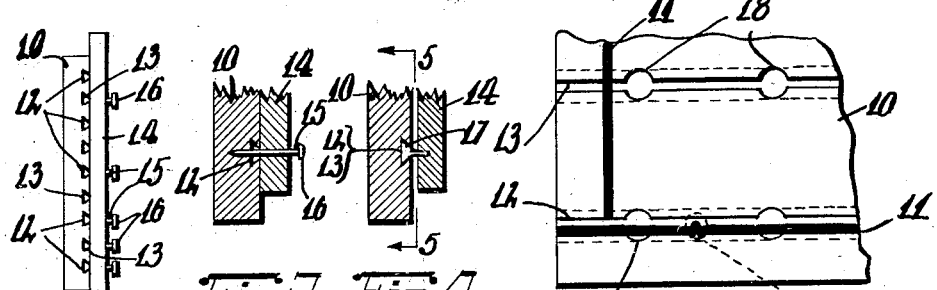
Fig. 2.  Fig. 3.  Fig. 4.  Fig. 5.
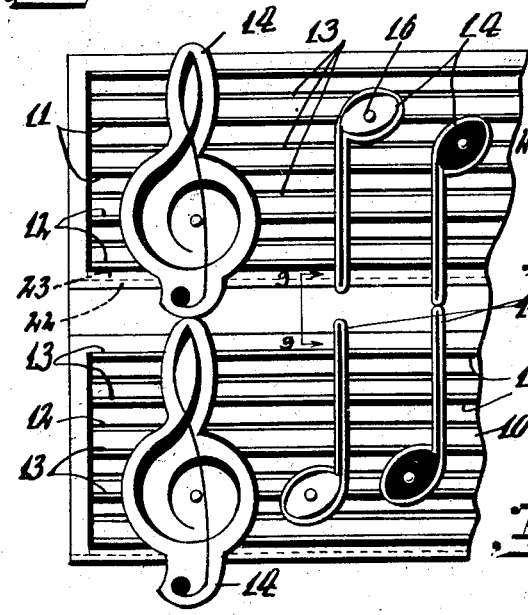
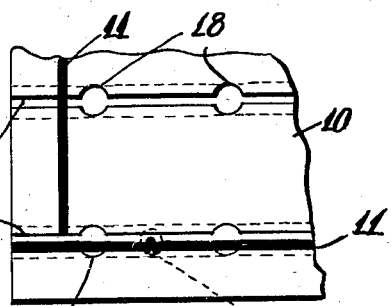
Fig. 7.  Fig. 6.
Fig. 9.
Fig. 8.
INVENTOR.
Ida Cash
BY
ATTORNEY Patented Apr. 15, 1930

1,754,458

UNITED STATES PATENT OFFICE

IDA CASH, OF BROOKLYN, NEW YORK

MUSICAL EDUCATIONAL TOY

Application filed November 13, 1928. Serial No. 319,123.

This invention relates generally to toys and has more particular reference to a novel musical educational toy.

The invention has for an object the provision of a device of the class mentioned which is of simple durable construction, desirable in use and efficient in action, and which can be manufactured and sold at a reasonable cost.

The invention proposes the use of a baseboard provided with a musical large staff painted or printed thereon and with longitudinal grooves on the lines of the staff and between the lines of the staff for guiding the fastening of musical symbols upon the baseboard. These musical symbols may be clefs, notes, flats, sharps, naturals, bars, etc., and may be placed upon the musical staff in various desirable positions for the enjoyment of a child and for teaching the child the reading of music. Attaching of the musical symbols upon the baseboard may be accomplished by tacks, slides, suction cups and other suitable means.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a front elevational view of a device constructed according to this invention.

Fig. 2 is an end elevational view thereof.

Fig. 3 is a fragmentary enlarged detail sectional view, taken on the line 3—3 of Fig. 1.

Fig. 4 is a view similar to Fig. 3, but disclosing a modification thereof.

Fig. 5 is a fragmentary sectional view, taken on the line 5—5 of Fig. 4.

Fig. 6 is a view similar to Fig. 4, but of further modified form.

Fig. 7 is a view similar to Fig. 6, but of further modified form.

Fig. 8 is a front elevational view of the device constructed according to another modified form.

Fig. 9 is a fragmentary sectional view, taken on the line 9—9 of Fig. 8.

The reference numeral 10 indicates generally a base made from wood, cardboard, or other material and having a musical large staff 11 painted or printed on its front face. On each of the lines of the staff and in the baseboard, a longitudinal groove 12 is formed, and other longitudinal grooves 13 are formed between the lines of the staff. Various musical symbols indicated generally by the numeral 14, and simulating clefs, notes, flats, sharps, naturals, bars, etc., are formed of cardboard, wood or other material and arranged for engaging upon the face of the baseboard and upon the large staff 11.

Each of these musical symbols is provided with a tack 15 having a head 16 on the top side of the symbol and extending thru the symbol and into the baseboard along one of the longitudinal grooves 12, 13. The longitudinal grooves are depended upon assuring the correct position of the musical symbols upon the staff.

In operation of the device any one or more, or all of the musical symbols may be lifted off of the baseboard and then reengaged in different positions for indicating different notes, and secured in these new positions by manual pressing upon the head 16 of the tacks into the material of the baseboard at points as guided by the longitudinal grooves 12, 13.

In the modified form of the device illustrated in Figs. 4 and 5 a musical symbol 14 has been illustrated with a slide 17 attached on its rear side and engageable in the grooves 12, 13. At various points along the grooves, openings 18 are formed for permitting the slides 17 to be removed out of the grooves. It is pointed out that any of the musical symbols may have its slide 17 passed thru one of the openings 18 and then moved along the groove for holding the symbol in any desired position for indicating different musical selections. When desired, these musical symbols may be disengaged by moving them along the baseboard to positions where the slide 17 may be slipped from the openings 18.

In the modified form of the device illustrated in Fig. 6 a musical symbol 14 has been illustrated with a slide 17' engaged in one of the grooves formed in the base 10. This slide 17' is of hollow tubular construction for permitting the passage of a tack 15' having a head 16'. The tack 15' may be manually slightly withdrawn for permitting the slide 17' to move along in the groove for positioning the musical symbol. As before stated, the slide may be withdrawn from the specific groove and reengaged in a different groove, but in any new position it may be held against displacement by manually forcing the tack 15' slightly in the material of the base 10.

In the modified form of the device illustrated in Fig. 7, the musical symbol 14 has been illustrated with a suction cup slide 20. This slide consists of a rear portion engaged in the material of the musical symbol and a front suction cup portion 20'. The edges of the suction portion 20' are flared as indicated by numeral 21 permitting it to slidably engage within the grooves, formed in the base 10. The suction cup portions of the slide are slightly smaller than the size of the groove so that when a desired position of the musical symbol has been reached manual pressure may be exerted on the rear portion thereof for causing the suction cup to hold against the base of the groove. In obtaining new positions of the musical symbol it is only necessary for manually moving the symbol for permitting air to enter within the suction cup and break its vacuum.

In the modified form of the device illustrated in Figs. 8 and 9, baseboards 10' have been illustrated with top tongues 22 and bottom grooves 23. A pair of these bases have been shown connected by the top tongue of the lower base engaging in the bottom groove of the upper base. Each of the bases may be constructed with the musical large staff and with the various musical symbols as before referred to. It is particularly pointed out that two or more lines of music may be arranged with this construction. For disengaging the bases it is only necessary to hold one base and manually move the other base for disengaging its tongue from the groove of the stationary base.

It is to be understood that the various musical symbols 14 which simulate clefs, notes, flats, sharps, naturals, bars, etc., may be made ornamental, and may contain cartoons, pictures of animals, or any other pictures, and that these notes may be pinned on top of the base 10 or within the groove. The suction cups 20 may also be forced against the faces on ungrooved base 10. It is also to be understood that baseboards 10' may be provided with tongues 22 and grooves 23 along their side edges, and attached to each other lengthwise.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A musical educational toy, comprising a baseboard with a musical staff thereon and longitudinal grooves on the lines of the staff and between the lines of the staff, and movable musical symbols on the baseboard and provided with slides engaging in the grooves for positioning of the symbols, the baseboard being provided with openings communicating with the grooves for the withdrawing of the slides intermediate the ends of the grooves.

2. A musical educational toy, comprising a baseboard with a musical staff thereon and longitudinal grooves on the lines of the staff and between the lines of the staff, and movable musical symbols on the baseboard and provided with slides engaging in the grooves for positioning of the symbols, the baseboard being provided with openings communicating with the grooves for the withdrawing of the slides intermediate the ends of the grooves, said slides being tubular, and tacks engage thru the musical symbols and the slides for holding the symbols in fixed positions.

3. A musical educational toy, comprising a baseboard with a musical staff thereon and longitudinal grooves on the lines of the staff and between the lines of the staff, and movable musical symbols on the baseboard and provided with slides engaging in the grooves for positioning of the symbols, the baseboard being provided with openings communicating with the grooves for the withdrawing of the slides intermediate the ends of the grooves, said slides being suction cups capable of assuming fixed positions in the grooves.

4. A musical educational toy, comprising a baseboard with a musical staff thereon and longitudinal grooves on the lines of the staff and between the lines of the staff, and movable musical symbols on the baseboard and provided with slides engaging in the grooves for positioning of the symbols, the baseboard being provided with openings communicating with the grooves for the withdrawing of the slides intermediate the ends of the grooves, and said base being arranged for connection with other bases for providing two or more lines of music.

In testimony whereof I have affixed my signature.

IDA CASH.